(12) United States Patent
Kermani

(10) Patent No.: US 8,271,287 B1
(45) Date of Patent: Sep. 18, 2012

(54) VOICE COMMAND REMOTE CONTROL SYSTEM

(75) Inventor: Bahram Ghaffarzadeh Kermani, Whitehall, PA (US)

(73) Assignee: Alcatel Lucent, Paris (FR)

( * ) Notice: Subject to any disclaimer, the term of this patent is extended or adjusted under 35 U.S.C. 154(b) by 1546 days.

(21) Appl. No.: 09/483,762

(22) Filed: Jan. 14, 2000

(51) Int. Cl.
*G10L 21/00* (2006.01)

(52) U.S. Cl. ........................................ 704/275

(58) Field of Classification Search .................. 704/270, 704/275, 270.1
See application file for complete search history.

(56) References Cited

U.S. PATENT DOCUMENTS

| | | | | |
|---|---|---|---|---|
| 4,360,808 A | | 11/1982 | Smith, III et al. ........ | 340/825.69 |
| 5,199,080 A | * | 3/1993 | Kimura et al. ................. | 381/110 |
| 5,226,090 A | | 7/1993 | Kimura .......................... | 381/110 |
| 5,247,580 A | | 9/1993 | Kimura et al. ................... | 381/43 |
| 5,267,323 A | | 11/1993 | Kimura .......................... | 381/110 |
| 5,855,003 A | * | 12/1998 | Ladden et al. ................. | 704/270 |
| 5,953,485 A | * | 9/1999 | Abecassis ....................... | 386/68 |
| 6,075,575 A | * | 6/2000 | Schein et al. .................. | 345/684 |
| 6,112,103 A | * | 8/2000 | Puthuff .......................... | 455/550 |
| 6,185,535 B1 | * | 2/2001 | Hedin et al. ................... | 704/270 |
| 6,269,336 B1 | * | 7/2001 | Ladd et al. ..................... | 704/270 |
| 6,301,513 B1 | * | 10/2001 | Divon et al. ...................... | 369/2 |
| 6,323,911 B1 | * | 11/2001 | Schein et al. .................. | 348/552 |
| 6,339,706 B1 | * | 1/2002 | Tillgren et al. ............... | 455/419 |
| 6,418,199 B1 | * | 7/2002 | Perrone ...................... | 379/88.01 |

\* cited by examiner

*Primary Examiner* — Michael N Opsasnick
(74) *Attorney, Agent, or Firm* — Carlson, Gaskey & Olds PC

(57) ABSTRACT

The invention is a method and apparatus for controlling electronic devices from a remote location. The method and apparatus utilizes a remote control device which receives and transmits voice commands as electrical signals to at least one controlled device having a recognition processor which converts received electrical signals to pattern data and compares that pattern data with data stored in the processor. The invention may incorporate the use of a recorder for recording electrical signals in the remote or controlled device and may further include a teaching circuit for retrieving and reproducing voice commands as visual or audio prompts as needed. The invention may be adapted to control multiple controlled devices in coordination so that each coordinated device is made to perform the same or a different function in response to a single voice command is disclosed.

26 Claims, 3 Drawing Sheets

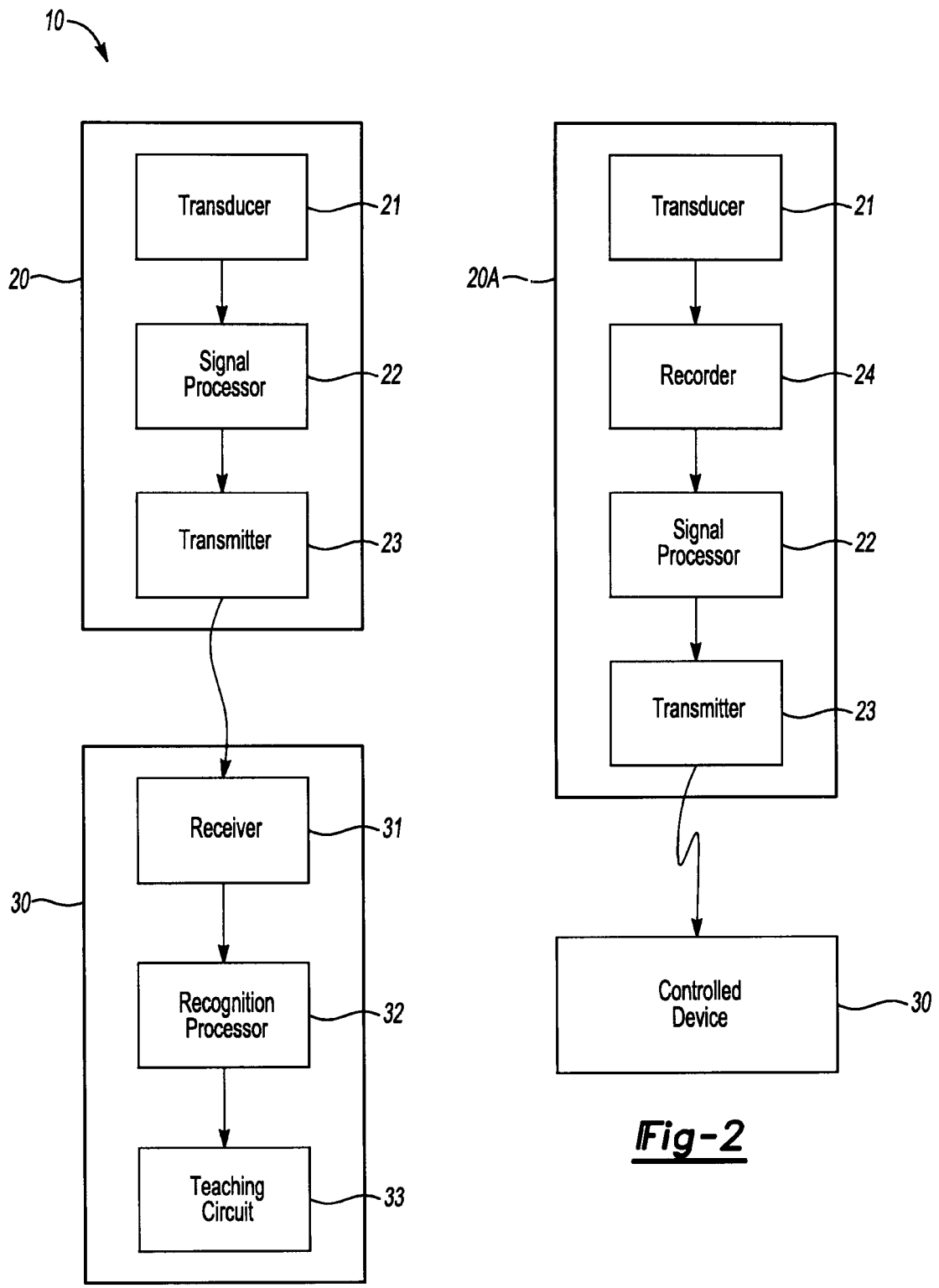

VOICE COMMAND REMOTE CONTROL SYSTEM

FIELD OF INVENTION

This invention relates generally to the control of electronic devices from a remote location. More specifically, the present invention relates to a voice command remote control system and a method for controlling a device from a remote location.

BACKGROUND

Remote control systems are commonly used in conjunction with a wide variety of electronic devices including: stereo sets, television receivers, cassette tape decks, video tape decks, compact disk players, digital video disk players, and the like. Such systems generally consist of a transmitter which is positioned remotely from a controlled electronic device and which, when appropriate command keys are pressed by a user, transmits a remote control signal to a receiver in the controlled device. The received remote control signal is then decoded to control the electronic device as intended by the user.

More recently, at least one remote control system has been designed employing voice control commands instead of control commands entered through keys. U.S. Pat. No. 5,199,080 issued to Kimura et al., for example, discloses a voice-operated remote control system wherein a voice command is spoken into the microphone of a remote hand-held device. The hand-held device includes circuitry and other means to convert the audio signal into digital pattern data. The hand-held device also includes means to compare the pattern data to other pattern data stored within the remote device. Then, remote control signals based on a recognized command are generated within the device and transmitted to a controlled device wherein they are decoded.

However, the present inventor has come to appreciate that such prior art voice-operated remote control systems are disadvantageous for several reasons. One disadvantage of such prior art systems is that it is expensive to manufacture apparatus for converting voice commands, storing and comparing pattern data, and generating and transmitting signals such that all the necessary apparatus fits within a hand-held remote device which is not too large or unwieldy. Another disadvantage is that prior art systems have problems of power consumption within the hand-held device. Because the hand-held device is powered by battery, every time it is used, each of the several functions performed within the device consumes a significant portion of the limited power supply. Although methods have been employed to reduce the drain of power within the device, such as hardware or software designed for "active power-down" of the remote, the present inventors have recognized a need for a voice-operated remote control system which reduces the number of functions performed within the remote device, which further reduces power consumption, and which further lowers the cost of manufacture.

SUMMARY OF THE INVENTION

The present invention overcomes the aforementioned problems with prior art voice-operated remote control systems by providing a system wherein essential functions including, for example, pattern recognition and storage, are performed within the controlled device rather than in the hand-held remote device. Accordingly, apparatus for performing the remaining functions of the hand-held device can be easily and inexpensively manufactured to fit within the hand-held device. Additionally, because fewer functions are performed within the remote device, there is less power consumption of the remote power source.

One aspect of the present invention is a voice-command based remote control system. In a preferred embodiment, the system comprises: (a) a remote control device having a transducer that converts an operator spoken voice command to an analog or digital electrical signal, a signal processor which processes the electrical signal prior to transmission and a transmitter that transmits the analog or digital voice signal to a first controlled device; and (b) a first controlled device having a recognition processor that converts the analog or digital electrical signal to analog or digital pattern data and compares the analog or digital pattern data with a plurality of sets of stored pattern data to recognize the spoken voice command as corresponding to one of the sets of the stored pattern data.

Another aspect of the present invention is the provision of a method of controlling a controlled device from a remote location. In a preferred embodiment, the method comprises the steps of: (a) speaking a voice command in proximity to a remote control device; (b) converting said voice command in said remote control device to an analog or digital electrical signal; (c) transmitting said analog or digital electrical signal to a first controlled device; (d) converting said analog or digital electrical signal into analog or digital pattern data within said first controlled device; and (e) comparing said analog or digital pattern data with a plurality of sets of pattern data stored within the first controlled device to recognize the spoken voice command as corresponding to one of the sets of the stored pattern data.

BRIEF DESCRIPTION OF THE DRAWINGS

The invention may best be understood by reference to the following description taken in conjunction with the accompanying drawings, wherein like reference numerals identify like elements, and wherein:

FIG. 1 is a block diagram of a remote control system in accordance with a first embodiment of the present invention;

FIG. 2 is a block diagram of a remote control system in accordance with a second embodiment of the remote control device of the present invention;

DETAILED DESCRIPTION OF THE INVENTION AND PREFERRED EMBODIMENTS

Figure 3:
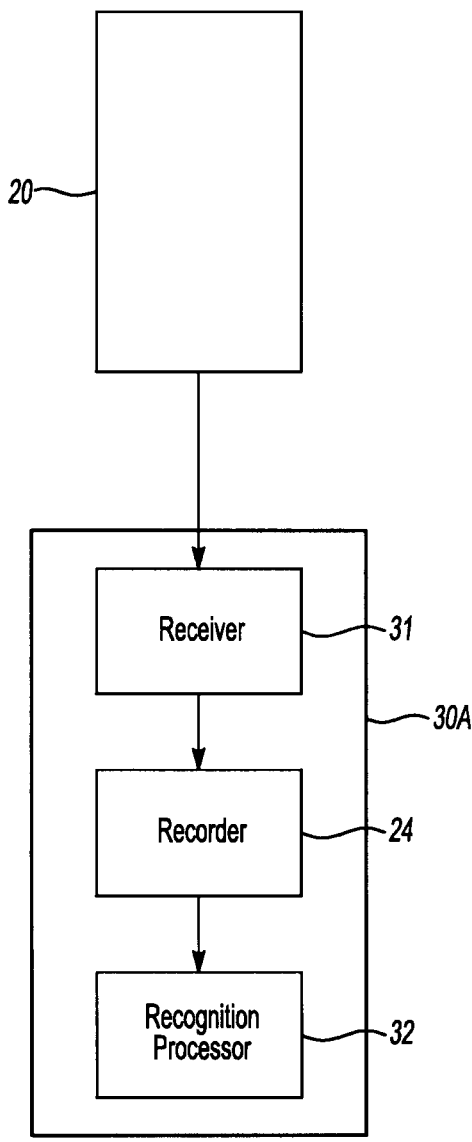
FIG. 3 is a block diagram of a remote control system in accordance with a second embodiment of the controlled device of the present invention.

FIG. 1 is a block diagram of a preferred embodiment of the present invention. Depicted schematically is a system 10 comprising a remote control device 20 and a controlled device 30.

The remote control device 20 of system 10 receives an operator spoken voice command, converts it to a corresponding analog or digital electrical signal, and transmits the electrical signal to the controlled device 30 wherein the electrical signal is decoded. The remote control device of the present invention is a hand-held device which should be small enough to fit comfortably in the hand of an operator. According to preferred embodiments of the present invention, the dimensions of the remote device include a length of about 9 inches or less, a width of about 4 inches or less and a height of about 2 inches or less. In more preferred embodiments, the remote device of the present invention has a length of less than about 7 inches, a width of less than about 3 inches and a height of less than about 1 inch.

The remote control device 20 comprises a transducer 21, such as a small microphone, a signal processing circuit 22 and a transmitter 23. Transducer 21 is coupled with signal processing circuit 22 and is designed to receive a voice command. Upon receiving a voice command, transducer 21 converts the sound of the voice command to an analog or digital electrical signal which is sent to signal processing circuit 22.

Signal processing circuit 22 is coupled with transmitter 23 and is configured to receive the electrical signal from transducer 21 and process the signal prior to transmission to the controlled device 30. The signal processing circuit may be configured to perform any of a number of known processing functions including, for example, signal filtering, analog to digital conversion, modulation onto a carrier, digitization, or any other standard processing function. Signal processing circuit 22 may comprise any of a wide range of apparatus, known in the art for processing a signal, such as a microprocessor, processor, digital signal processor, computer, state machine, analog circuitry, combinational logic or essentially any other analog or digital processing unit. After the electrical signal is processed, it is transmitted through transmitter 23 to controlled device 30.

There are numerous methods, known in the prior art, for processing and transmitting a voice command as an analog or digital electrical signal, and any of these known methods may be used in the present invention. Examples of suitable known methods of modulation include, but are not limited to, amplitude modulation ("AM"), frequency modulation ("FM") or pulse-code modulation ("PCM"). Additionally, carrier media suitable for the present invention include, but are not limited to, radio-frequency ("RF"), infrared ("IR") or ultrasound carriers. U.S. Pat. No. 4,360,808 issued to Smith, III, et al., the disclosure of which is incorporated herein by reference, describes a system wherein a user enters a voice command which is converted to an analog signal which, in turn, modulates an RF carrier via amplitude modulation. In this manner, an analog RF signal is generated and transmitted to an RF receiver where it can be decoded. Additionally, Smith, III, et al. discloses a method of transmitting data via pulse modulation of an RF carrier. Accordingly, the above-described methods of modulation and transmission, as well as any other methods known in the prior art, may be used to modulate and transmit electrical signals according to the present invention.

The controlled device 30 comprises a receiver 31, and a recognition processor 32 that analyzes received electrical signals corresponding to voice commands, converts the received signals to pattern data, compares the pattern data with other pattern data stored within the recognition processor to determine if the entered voice command corresponds to one of the sets of stored pattern data and produces command signals corresponding to recognized electrical signals. As used herein, the term "recognized electrical signal" refers to an electrical signal that has been converted to analog or digital pattern data which corresponds to a pattern stored within the recognition circuit.

The receiver 31 is coupled to recognition processor 32 and should be adapted to receive the analog or digital electrical signal transmitted from the remote device 20. For example, if the electrical signal modulates an infrared carrier, receiver 31 may comprise an infrared receiver or detector. However, if the electrical signal modulates a radio-frequency carrier, for example, receiver 31 may comprise a receiver or detector of radio-frequency signals. Numerous other receivers are known in the art and any of these known receivers can be used in the present invention.

After an electrical signal is received by the receiver 31, it is analyzed by recognition processor 32 to determine whether it is a recognized electrical signal or not. If the electrical signal is recognized by processor 32, a corresponding command signal is generated within the controlled device 30 to direct device 30 to perform a preset function. If the electrical signal is not recognized by the recognition processor, the signal can be merely ignored by the first controlled device, or an error command may be generated and transmitted within the controlled device to produce an audio and/or visual error message which informs a user that the previous voice command was not recognized. For example, a controlled device having a visual display, such as a television or a stereo, may display a word message or a symbol, such as "command not recognized" or a picture of a remote device with a slash through it, on the visual display to indicate that a voice command was not recognized. Alternatively, an audio message such as a buzzer or voice saying "not recognized" could be produced through a speaker on the controlled device to indicate that a voice command was not recognized.

Additionally, the recognition processor may be designed to recognize entire command phrases and/or portions of command phrases. For example, if a predetermined command for raising the volume one unit was "volume up", the recognition processor of the present invention could be configured to recognize only the entire phrase "volume up" or could be designed to recognize the words "volume" and "up" separately.

The pattern data stored in the recognition processor can be initially entered by a manufacturer or a user and can be subsequently changed by a user. Also, as desired, recognition algorithms used in the recognition processor can be user-independent or user-dependent. For example, U.S. Pat. No. 5,199,080 issued to Kimura et al., the disclosure of which is incorporated herein by reference, describes a recognition processor wherein voice signals are converted to time-division digital data and compared with stored time-division digital data. Additionally, it is known to compare data relating to signal energies or cross-correlation between signals for recognition purposes. Any of these methods of signal recognition, as well as other methods known in the art, can be used in the present invention.

Recognition processors are known in the art and any of a wide range of these processors can be used in the present invention. Those of ordinary skill in the art will recognize that the recognition processor will most likely comprise a digital signal processor, however other processors such as a microprocessor, computer, state machine or other analog or digital processing circuitry may be used.

Furthermore, it should be noted that for illustrative purposes the remote and controlled devices described above have been divided into systems and discrete components. However, the means for processing and transmitting signals within the remote device may be further integrated or divided into discrete components without departing from the scope of the invention. Similarly, the means for receiving an electrical signal, converting the electrical signal to digital pattern data, comparing the digital pattern data with stored pattern data and producing a command signal within the controlled device may be further integrated or divided into discrete components without departing from the scope of the invention.

Optionally, the controlled device 30 of the present invention may further comprise a teaching circuit 33 which produces audio or visual command prompts to remind a user what voice command to enter to control device 30 in a desired manner. Teaching circuit 33 is coupled to the recognition processor 32 from which the teaching circuit can retrieve stored data corresponding to desired voice commands. Any of a number of known means for retrieving stored data relating to a command and displaying that command can be used in the present invention. For example, U.S. Pat. No. 5,267,323 issued to Kimura, the disclosure of which is herein incorporated by reference, describes a speech reproduction unit wherein the remote device has several buttons, each corresponding to a different voice command and function, which when pressed, direct the speech reproduction unit to retrieve stored voice commands and reproduce them as audio prompts. Alternatively, the controlled device of the present invention could display a selectable list of all functions or selected functions performed by the controlled device in response to a "help" command entered either vocally or through a button by a user. Then the user could select the function for which a corresponding command is required, through a select button or other means, to direct the teaching circuit to produce a command prompt corresponding to the desired voice command.

Additionally, as desired, the remote control system of the present invention may further comprise a recorder 24, located in either the remote device or the controlled device of the present invention, for recording analog or digital electrical signals corresponding to spoken voice commands. For example, FIG. 2 is a diagram of a remote device 20A in accordance with the present invention wherein a recorder 24 is coupled to a transducer 21 and a signal processor 22 such that electrical signals sent from the transducer are recorded by recorder 24 and can be sent to the signal processor 22 for processing and transmission. Alternatively, a recorder located in a controlled device 30A, as shown in FIG. 3, may be coupled, for example, to a receiver 31 and a recognition processor 32 such that electrical signals received by receiver 31 may be recorded by recorder 24 and simultaneously or subsequently sent for processing in signal processor 22.

By recording analog or digital signals corresponding to spoken voice commands, the embodiments of the present invention comprising recorder 24 allow a user to repeatedly reproduce and send recorded analog or digital signals to the controlled device without having to repeatedly speak the corresponding voice commands into the remote control device. For example, when controlling a controlled device such as a television, a user may desire to "channel surf", that is, to have the television advance channels numerous times in quick succession. It would be inconvenient for a user who wants to channel surf to have to speak a voice command into the remote device 20 prior to each channel advancement. Accordingly, by recording the analog or digital signal generated by the transducer when the voice command is first entered, a remote device of the present invention having a recorder allows a user to repeatedly retrieve and transmit the last recorded voice signal by merely pressing a repeat button or through other means known in the art.

The recorder of the present invention may be embodied within the remote device and may be voice-activated and/or may be activated by pressing a button and can be configured to record an electrical signal prior to, or concurrently with, processing and transmission of the electrical signal. For example, where the recorder in a remote device is voice activated, a voice command is spoken into the remote device to activate the transducer and recorder such that an electrical signal corresponding to the entered voice command is recorded. Subsequently, the last recorded electrical signal can be sent to the transmitter for processing and transmission by pressing a repeat button. On the other hand, where the remote device recorder is not voice-activated, a voice command electrical signal can be recorded prior to transmission by pressing a record button and entering a voice command. The recorded signal can then be transmitted to the controlled device by pressing the repeat button.

When the recorder is located in the controlled device, a voice command electrical signal can be recorded prior to recognition of the signal either through voice-activation, where the transducer, signal processor, transmitter, receiver and recorder are all activated in response to a user's voice command, or through the use of a record button on the remote device which is pressed prior to entering a command to activate the aforementioned apparatus and record a voice command electrical signal. Subsequently, a recorded electrical signal can be retrieved from the recorder and sent to the recognition circuit by pressing a repeat button on the remote device.

Additionally, whether activated by button, voice or other means, recorder 24 may be configured to temporarily stop recording during the pauses in a user's speech to conserve both power and recording memory space.

Recorders for recording electrical signals are known in the art and recorder 24 should be adapted to record the analog or digital electrical signals produced by the transducer 21 if in the remote device or the pattern data if in the controlled device. For example, when an analog signal is produced by transducer 21, the recorder may comprise an analog tape recorder or other known recorder suitable for recording an analog signal. When a digital signal is produced, the recorder 24 may comprise any of a wide variety of digital recorders known in the art including, for example, a flash EEPROM or RAM recording device.

Furthermore, the voice command remote control system of the present invention may comprise more than one controlled device which can be controlled by a user via the remote device. In one embodiment, the remote device of the present invention may be used as a universal remote to separately control multiple controlled devices. In this embodiment, a user may control one controlled device by entering voice commands which are transmitted as signals only recognized by the one device or may alternately control another controlled device by entering voice commands which are transmitted as signals only recognized by the second controlled device.

The use of a single, universal remote to control multiple controlled devices is known, and any known method for transmitting electrical signals to several controlled devices wherein a signal recognized by one controlled device is not recognized by the other controlled devices may be used in the present invention. For example, the remote system of the present invention may distinguish electrical signals to be recognized by different controlled devices through the use of different vocal commands to control each of the different devices. Alternatively, the remote device may be configured to modulate the electric signals at different carrier frequencies for various controlled devices, each configured to receive signals at a different frequency.

Alternatively, the remote control system of the present invention may comprise multiple controlled devices which are coordinated in a manner such that entering one voice command into the remote device will direct a first controlled device and at least a second controlled device to perform preset functions. By coordinating multiple devices in this manner, the present invention allows a user to efficiently control multiple devices without having to enter separate voice commands for each controlled device. For example, while watching television, a user may wish "screen" incoming telephone calls through the use of a telephone answering device ("TAD"), that is, to listen to incoming telephone messages being recorded onto the TAD rather than picking up the telephone. In doing so, a user may desire to mute or lower the volume on the television and raise the volume on the TAD to better hear incoming telephone messages as they are recorded. It would be inconvenient and time-consuming for a user to have to enter a voice command directing the television to mute or lower its volume and then enter a different command directing the TAD to raise its volume as the message begins recording on the TAD. Accordingly, the present invention would allow the user to enter and transmit one command to have the television and TAD perform the desired functions.

In one embodiment, the multiple, coordinated controlled devices of the present invention may be configured to separately and simultaneously receive and recognize a single electrical signal, transmitted from the remote control and corresponding to an entered voice command, to direct the multiple controlled devices to perform the same or different functions. For example, two controlled devices such as a television and a TAD may be configured such that by entering the command "power off" into the remote device, a user can transmit an electrical signal which is received and recognized by both the television and the TAD and directs both devices to power down. Alternatively, a command such as "TAD volume up" may be transmitted as an electrical signal which is received separately by both devices but which is recognized by the TAD as directing it to raise its volume and is recognized by the television as directing it to mute or lower its volume.

Those of skill in the art will recognize that the processing means and carrier used in the present invention to modulate and transmit the voice command as an electrical signal may affect the relative positioning of the receivers of multiple controlled devices designed to receive a single electrical signal. For example, it is known that some through the air transmission media, such as IR and laser, operate at a frequencies which transmit "in line of sight", i.e. in a straight line. Accordingly, two or more devices designed to separately receive an IR signal would need to have receivers in close proximity such that the signal could be transmitted between the remote device and multiple receivers in an unobstructed, generally linear area. On the other hand, it is known that other transmission media, such as RF, can pass through obstructions. Thus, two devices configured to receive the same RF signal could be placed in different directions relative to the remote device and even in different rooms. In light of the above, those of ordinary skill in the art will be able to select appropriate transmission media for use of remote control system of the present invention in various applications.

In another embodiment, the multiple, coordinated controlled devices of the present invention are configured such that the electrical signal transmitted from the remote device is received by one controlled device which, in response to recognizing the signal, performs a preset function and/or generates and transmits another electrical signal from a transmitter to a second controlled device. Upon receiving the second electrical signal, the second controlled device can perform the same or a different function performed by the first controlled device and/or generate and transmit an electrical signal from a transmitter to a third controlled device. In this manner, any number of multiple controlled devices may be coordinated to be controlled by a single entered voice command.

For example, a user controlling three controlled devices, such as a television, a TAD and a video cassette recorder ("VCR"), may wish to be able to stop the playback of the VCR, lower the volume of the television and raise the volume of the TAD with the single command "screen calls" in order to screen incoming telephone calls. According to the present invention, the devices may be coordinated such that an electrical signal corresponding to the voice command is transmitted to one device, such as the television, which receives and recognizes the signal as directing it to lower its volume and send another electrical signal to the VCR. Upon receiving the electrical signal from the television, the VCR recognizes it as directing it to stop playback and send a third electrical signal to the TAD. Upon receiving and recognizing the third signal, the TAD raises the volume of the incoming message.

Figure 6:
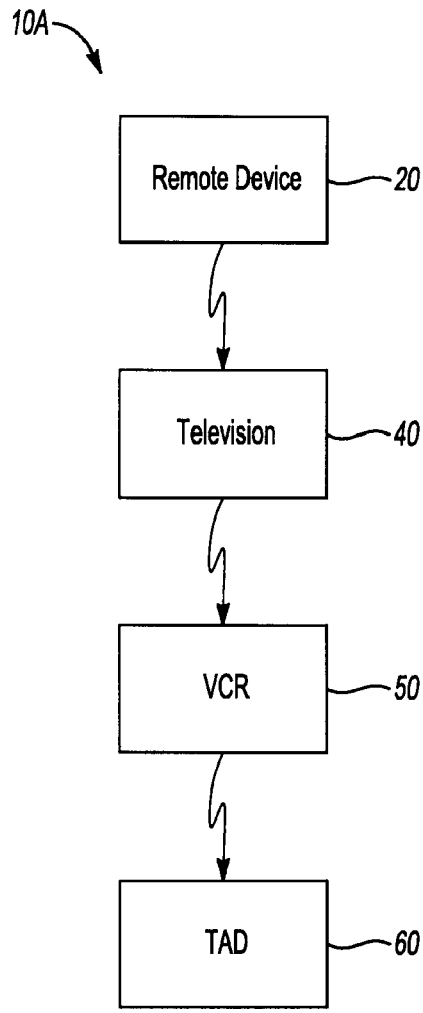
FIG. 6 is a block diagram of a remote control system in accordance with one embodiment of the present invention having three controlled devices.

FIG. 6 shows a remote control system 10A according to one embodiment of the present invention having a remote device 20 and three coordinated controlled devices: television 40, VCR 50 and TAD 60. The devices depicted in system 10A are representative of the types of controlled devices that may be found in a traditional home, however, the type and number of devices are for illustrative purposes only and are neither required nor restrictive. The controlled devices shown in FIG. 6 are configured such that television 40 is capable of receiving and electrical signal from device 20 and transmitting another electrical signal to VCR 50. VCR 50 is configured to receive the electrical signal from television 40 and transmit a third electric signal to TAD 60. TAD 60 in turn is capable of receiving and recognizing the electrical signal from VCR 50.

In yet another embodiment, the multiple, coordinated controlled devices of the present invention are configured such that the electrical signal from the remote device is received by a first controlled device which recognizes the electrical signal and transmits control signals to one or more controlled devices directing the devices to perform preset functions. As used herein the term "control signal" refers generally to a modern interface signal which, when received by a controlled device, directs the controlled device to start, stop or modify a function without having to be recognized in a recognition processor in the manner disclosed above. In this manner, multiple devices can be controlled through a single command while only one controlled device is required to have a recognition processor.

Figure 7:
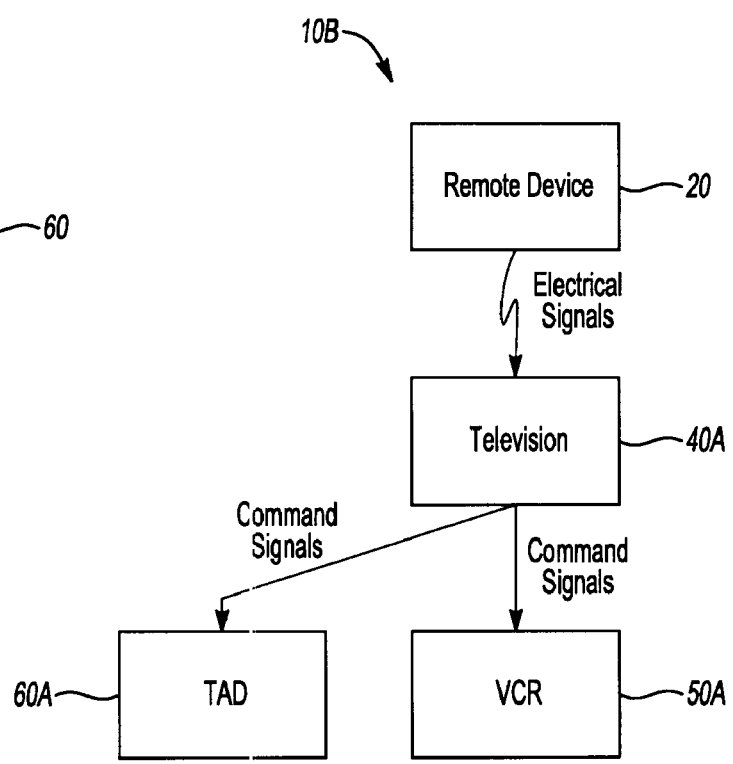
FIG. 7 is a block diagram of a remote control system in accordance with another embodiment of the present invention having three controlled devices.

For example, FIG. 7 shows a remote control system 10B according to an embodiment of the present invention having three coordinated controlled devices. Remote control system 10B comprises remote device 20, and three controlled devices: television 40A, VCR 50A and TAD 60A. The controlled devices shown in FIG. 7 are configured such that television 40A is capable of receiving and recognizing an electrical signal from remote device 20 and transmitting control signals to TAD 50A and VCR 60A responsive thereto. TAD 50A and VCR 60A in turn are each capable of receiving and recognizing a control signal transmitted from television 40A.

A remote control system according to the present invention could be configured to perform numerous other coordinated functions such as, for example, causing the television to mute or decrease volume when the TAD is instructed to play, increasing the television volume to a previously set level when the playback of TAD messages is stopped, or essentially any other functions that a user wishes to have performed in response to a single voice command.

Devices which are coordinated according to the present invention may be connected via wires, wireless connections or any other means known in the art for connecting devices such that signals may be transmitted therebetween.

Remote Device

Figure 4:
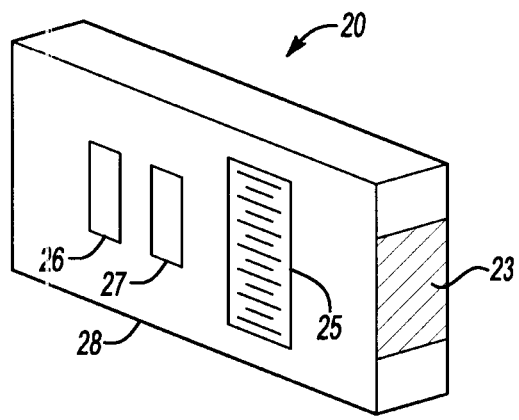
FIG. 4 is a diagram of a remote control device in accordance with one embodiment of the present invention.

Shown in FIG. 4 is one embodiment of the external structure of remote device 20 of the present invention. Remote device 20 has a unitary casing 28 which supports microphone 25 and transmitter 23.

Figure 5:
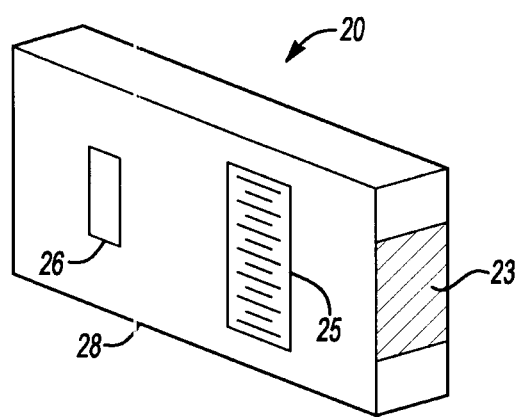
FIG. 5 is a diagram of a remote control device in accordance with another embodiment of the present invention.

Furthermore, device 20 has at least one button 26 and, as shown in FIG. 4, may comprise a second button 27. When device 20 comprises only a first button, as shown FIG. 5, the first button acts as an on/off switch for remote device 20. When pressed, the first button is in the "on" position and the remote device 20 is capable of receiving a voice command and transmitting a corresponding electrical signal. When released, the first button is in the "off" position and no power is supplied to the transducer or transmitter to allow transmission of a voice signal.

When remote device 20 has two buttons, as shown in FIG. 4, first button 26 which acts primarily as a voice input or record button and a second button 27 which acts primarily as a repeat button. When an audio voice command is to be entered, the record button 26 is pressed to operate the recorder 24 and is held down until the user is finished speaking a command. Recorder 24 stops recording when record button 26 is released. Once an electrical signal corresponding to the voice command is recorded, the second button 27 may be pressed to send the last recorded electrical signal to transmitter 22 for transmission of the electrical signal to the first controlled device 30. Additionally, the first and second buttons may be configured to perform other functions.

As described above, the present invention provides a remote control system having advantages over voice command remote controlled systems in the prior art. By recognizing electrical signals corresponding to voice commands in a controlled device rather than in a remote device, the remote device of the present invention can be more easily and inexpensively manufactured and can be operated with less power consumption of the remote power source.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A voice command remote control system comprising:
a remote control device for controlling a household appliance controlled device comprising:
a transducer that converts sound of an audio voice command to an electrical signal;
a transmitter that transmits said electrical signal to a first controlled device, wherein said first controlled device comprises:
a recognition processor that converts said electrical signal to pattern data and compares said pattern data with a plurality of sets of stored pattern data to recognize said audio voice command as corresponding to one of the sets of the stored pattern data;
comprising said first controlled device and wherein said first controlled device performs a preset function corresponding to said audio voice command in response to recognition of said audio voice command; and
a recorder that records said electrical signal.

2. The voice command remote control system of claim 1, wherein the recorder is located in the remote device.

3. The voice command remote control system of claim 1, wherein the recorder is located in the controlled device.

4. The voice command remote control system of claim 2, wherein said remote control device further comprises a repeat button and wherein said recorder is activated to reproduce a last recorded electrical signal for transmission to a first controlled device responsive to activation of said repeat button.

5. The voice command remote control system of claim 4, further comprising a record button and wherein said recorder is activated to record said electrical signals responsive to activation of said record button.

6. The voice command remote control system of claim 4, wherein said recorder is voice-activated and wherein said recorder is activated to record said electrical signals responsive to voice-activation.

7. A voice command remote control system comprising:
a remote control device for controlling a household appliance controlled device comprising:
a transducer that converts sound of an audio voice command to an electrical signal;
a transmitter that transmits said electrical signal to a first controlled device, wherein said first controlled device comprises:
a recognition processor that converts said electrical signal to pattern data and compares said pattern data with a plurality of sets of stored pattern data to recognize said audio voice command as corresponding to one of the sets of the stored pattern data;
comprising said first controlled device and wherein said first controlled device performs a preset function corresponding to said audio voice command in response to recognition of said audio voice command; and
wherein said first controlled device further comprises a transmitter for generating and transmitting a second electrical signal to a second controlled device.

8. The voice command remote control system of claim 7, further comprising a second controlled device which receives said second electrical signal and has a recognition processor that converts said second electrical signal to pattern data and compares said pattern data with a plurality of sets of stored pattern data to recognize said audio voice command as corresponding to one of the sets of the stored pattern data.

9. The voice command remote control system of claim 8, wherein said second controlled device further comprises a transmitter for generating and transmitting a third electrical signal to a third controlled device.

10. The voice command remote control system of claim 1, wherein said first controlled device further comprises a transmitter for generating and transmitting a control signal to a second controlled device.

11. The voice command remote control system of claim 10, further comprising a second controlled device which receives said control signal and performs a preset function responsive to said control signal.

12. A method of controlling at least one controlled device from a remote location comprising the steps of:
a. receiving an audio voice command into a remote control device;
b. converting said audio voice command to an electrical signal in said remote control device;

c. transmitting said electrical signal from said remote control device to a first controlled device;
d. converting said electrical signal into pattern data within said first controlled device;
e. comparing said pattern data with a plurality of sets of pattern data stored within the first controlled device to recognize the audio voice command as corresponding to one of the sets of the stored pattern data; and
f. recording the electrical signal on a recorder located within the remote control device.

13. The method of claim 12, further comprising the step of retrieving a last recorded signal from the recorder and transmitting said last recorded signal to said first controlled device responsive to activation of a repeat button.

14. The method of claim 13, wherein the electrical signal is recorded by pressing a record button to activate a recorder and releasing the record button to stop recoding.

15. The method of claim 14, wherein the electrical signal is recorded by speaking into a voice-activated recorder.

16. A method of controlling at least one controlled device from a remote location comprising the steps of:
  a. receiving an audio voice command into a remote control device;
  b. converting said audio voice command to an electrical signal in said remote control device;
  c. transmitting said electrical signal from said remote control device to a first controlled device;
  d. converting said electrical signal into pattern data within said first controlled device;
  e. comparing said pattern data with a plurality of sets of pattern data stored within the first controlled device to recognize the audio voice command as corresponding to one of the sets of the stored pattern data; and
  f. transmitting a second electrical signal from said first controlled device to a second controlled device.

17. The method of claim 16, further comprising the step of converting said second electrical signal into a second set of pattern data within said second controlled device.

18. The method of claim 17, further comprising the step of comparing said second set of pattern data with a plurality of sets of pattern data stored within said second controlled device to recognize said audio voice command as corresponding to one of said sets of pattern data stored within the second controlled device.

19. The method of claim 18, further comprising the step of transmitting a third electrical signal from said second controlled device to a third controlled device.

20. The method of claim 16, further comprising the step of generating and transmitting a control signal from said first controlled device to a second controlled device.

21. The method of claim 20, further comprising the step of performing a present function corresponding to said audio voice command in said second controlled device in response to recognition of said audio voice command.

22. The method of claim 19 wherein said first, second, and third controlled devices are independently selected from the group consisting of telephone answering devices, television sets, stereos, video cassette recorders, compact disk players, cassette tape players, and digital video disk players.

23. The method of claim 22 wherein at least one of said first, second, and third controlled devices comprises a telephone answering device.

24. The method of claim 22 wherein at least one of said first, second, and third controlled devices comprises a television set.

25. The method of claim 24 further comprising the step of recording the electrical signal on a recorder located within the remote control device.

26. The method of claim 25 further comprising the step of retrieving a last recorded signal from the recorder and transmitting said last recorded signal to said first controlled device responsive to activation of a repeat button.

* * * * *